US012166171B2

United States Patent
Kubo et al.

(10) Patent No.: US 12,166,171 B2
(45) Date of Patent: Dec. 10, 2024

(54) SOLID ELECTROLYTE MATERIAL AND BATTERY USING THE SAME

(71) Applicant: Panasonic Intellectual Property Management Co., Ltd., Osaka (JP)

(72) Inventors: Takashi Kubo, Hyogo (JP); Tetsuya Asano, Nara (JP); Akinobu Miyazaki, Osaka (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 602 days.

(21) Appl. No.: 17/460,406

(22) Filed: Aug. 30, 2021

(65) Prior Publication Data
US 2021/0391595 A1 Dec. 16, 2021

Related U.S. Application Data

(63) Continuation of application No. PCT/JP2019/048473, filed on Dec. 11, 2019.

(30) Foreign Application Priority Data

Mar. 15, 2019 (JP) ................................ 2019-048882

(51) Int. Cl.
*H01M 10/0562* (2010.01)
(52) U.S. Cl.
CPC .. *H01M 10/0562* (2013.01); *H01M 2300/008* (2013.01)

(58) Field of Classification Search
CPC .................................................. H01M 10/0562
See application file for complete search history.

(56) References Cited

U.S. PATENT DOCUMENTS

| | | | |
|---|---|---|---|
| 2012/0301796 A1 | 11/2012 | Ohtomo et al. | |
| 2019/0088995 A1 | 3/2019 | Asano et al. | |
| 2019/0140265 A1* | 5/2019 | Miara | H01M 10/0525 |
| 2020/0350622 A1* | 11/2020 | Sakaida | H01M 10/0525 |
| 2022/0255125 A1* | 8/2022 | Suzuki | H01B 1/06 |

FOREIGN PATENT DOCUMENTS

| | | | |
|---|---|---|---|
| CN | 111509222 A | * | 8/2020 |
| JP | 2006-244734 | | 9/2006 |
| JP | 2011-129312 | | 6/2011 |

(Continued)

OTHER PUBLICATIONS

Wang et al., A dual-matrix hybridization strategy for synthesis of cationic-anionic double-doped Li2.99Y0.99Zr0.01Br1.6Cl4.4 halide solid electrolyte, Journal of Solid State Electrochemistry (2023) 27:3597-3602 (Year: 2023).*

(Continued)

Primary Examiner — Amanda C. Walke
(74) Attorney, Agent, or Firm — Greenblum & Bernstein, P.L.C.

(57) ABSTRACT

The present disclosure provides a solid electrolyte material having a high lithium ion conductivity. The solid electrolyte material according to the present disclosure consists essentially of Li, Zr, Y, M, and X. M is at least one element selected from the group consisting of Al, Ga, In, Sc, and Bi. X is at least one element selected from the group consisting of Cl and Br.

7 Claims, 2 Drawing Sheets

(56) References Cited

FOREIGN PATENT DOCUMENTS

| | | | | |
|---|---|---|---|---|
| JP | 2015-111532 A | 6/2015 | | |
| WO | 2018/025582 | 2/2018 | | |
| WO | 2018/198494 | 11/2018 | | |
| WO | WO-2019146219 A1 * | 8/2019 | .............. | C01F 17/36 |
| WO | WO-2021187391 A1 * | 9/2021 | ........ | H01M 10/0562 |

OTHER PUBLICATIONS

International Search Report of PCT application No. PCT/JP2019/048473 dated Mar. 10, 2020.
Office Action for EP App. No. 19 919 751.8, dated Apr. 4, 2023.
Bohnsack et al., "Type A3MX6 Ternary Halides VI. Ternary Chlorides of the Rare-Earth Elements with Lithium, Li3MCl6 (M=Tb—Lu, Y, Sc): Synthesis, Crystal Structures and Ionic Motion", Zeitschrift Fur Anorganische Und Allgemeine Chemie, 623:1067-1073, (1997), XP055600040.
Bohnsack et al., "Type A3MX6 Ternary Halides VII. The Bromides Li3MBr6 (M=Sm—Lu, Y): Synthesis, Crystal Structure, and Ionic Mobility", Zeitschrift Fur Anorganische Und Allgemeine Chemie, 623:1352-1356, (1997), XP055600030.
Asano et al., "Solid Halide Electrolytes with High Lithium-Ion Conductivity for Application in 4 V Class Bulk-Type All-Solid-State Batteries", Advanced Materials, 30(44):1-7, (2018), XP055721991.
Office Action for IN App. No. 202147040238, dated Apr. 28, 2023.

* cited by examiner

SOLID ELECTROLYTE MATERIAL AND BATTERY USING THE SAME

BACKGROUND

1. Technical Field

The present disclosure relates to a solid electrolyte material and a battery using it.

2. Description of the Related Art

Japanese Unexamined Patent Application Publication No. 2011-129312 discloses an all-solid battery using a sulfide solid electrolyte material.

International Publication No. WO 2018/025582 discloses a solid electrolyte material represented by a composition formula $Li_{6-3z}Y_zX_6$ (0<z<2, X=Cl or Br).

SUMMARY

One non-limiting and exemplary embodiment provides a solid electrolyte material having a high lithium ion conductivity.

In one general aspect, the techniques disclosed here feature a solid electrolyte material consisting essentially of Li, Zr, Y, M, and X, where M is at least one element selected from the group consisting of Al, Ga, In, Sc, and Bi; and X is at least one element selected from the group consisting of Cl and Br.

The present disclosure provides a solid electrolyte material having a high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
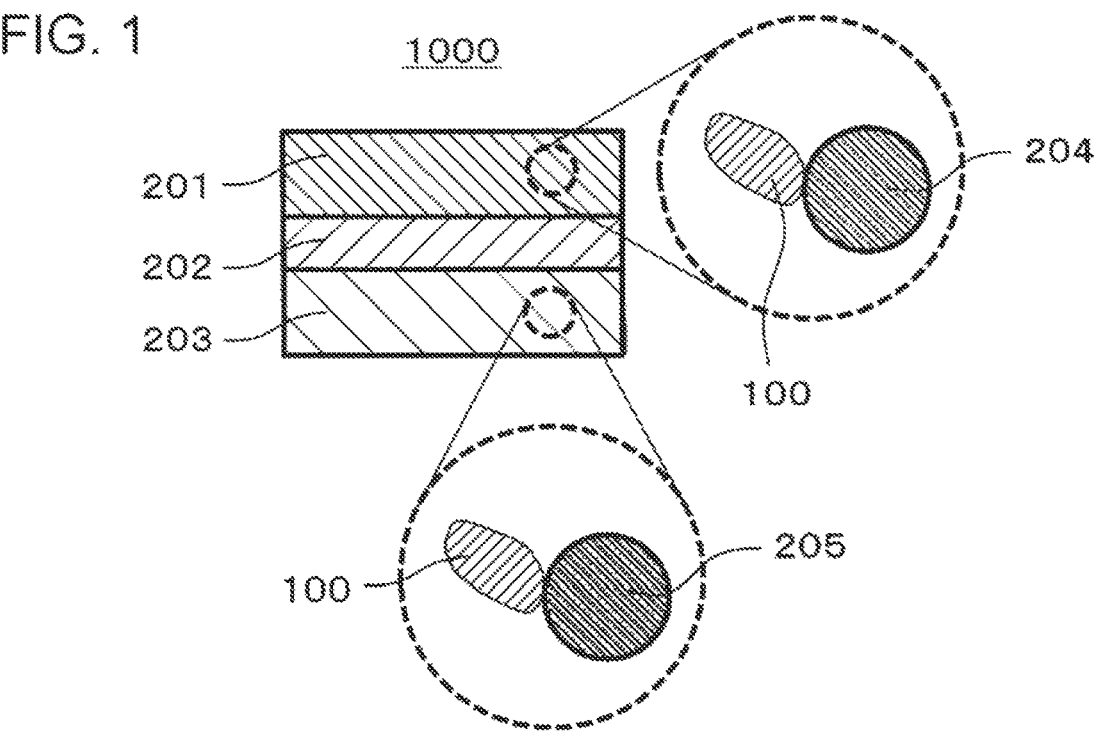
FIG. 1 shows a cross-sectional view of a battery 1000 according to Second Embodiment.

Embodiments of the present disclosure will now be described with reference to the drawings.

First Embodiment

A solid electrolyte material according to a First Embodiment consists essentially of Li, Zr, Y, M, and X. M is at least one element selected from the group consisting of Al, Ga, In, Sc, and Bi. X is at least one element selected from the group consisting of Cl and Br. The solid electrolyte material according to the First Embodiment has a high lithium ion conductivity.

The solid electrolyte material according to the First Embodiment can be used for obtaining a battery having excellent charge and discharge characteristics. Examples of the battery include an all-solid secondary battery.

The solid electrolyte material according to the First Embodiment desirably does not include sulfur. A solid electrolyte material not containing sulfur does not generate hydrogen sulfide even when exposed to the atmosphere and therefore has excellent safety. It should be paid attention that the sulfide solid electrolyte material disclosed in Japanese Unexamined Patent Application Publication No. 2011-129312 may generate hydrogen sulfide when exposed to the atmosphere.

The solid electrolyte material according to the First Embodiment may consist essentially of Li, Zr, Y, M, and X. "A solid electrolyte material according to the First Embodiment consisting essentially of Li, Zr, Y, M, and X" means that in the solid electrolyte material according to the First Embodiment, the molar ratio of the total mass of Li, Zr, Y, M, and X to the total mass of all elements constituting the solid electrolyte material is 90% or more. As an example, the molar ratio may be 95% or more. The solid electrolyte material according to the First Embodiment may consist of only Li, Zr, Y, M, and X. Such a solid electrolyte material has a high lithium ion conductivity.

The solid electrolyte material according to the First Embodiment may contain an inevitably included element. Examples of the element include hydrogen, nitrogen, and oxygen. These elements may be present in raw material powders of the solid electrolyte material or in the atmosphere for manufacturing or storing the solid electrolyte material.

The solid electrolyte material according to the First Embodiment may be a material represented by a composition formula (1):

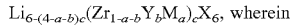

$Li_{6-(4-a-b)c}(Zr_{1-a-b}Y_bM_a)_cX_6$, wherein the following mathematical expressions:

$a>0$;

$b>0$;

$(a+b)<1$; and $0<c<1.5$ are satisfied.

The material represented by the formula (1) has a high lithium ion conductivity. The solid electrolyte material does not include sulfur and is therefore has excellent safety.

In order to enhance the lithium ion conductivity of the solid electrolyte material, in the composition formula (1), a mathematical expression: $0.01 \leq a \leq 0.4$ may be satisfied, or a mathematical expression: $0.05 \leq a \leq 0.4$ may be satisfied. In order to further enhance the lithium ion conductivity of the solid electrolyte material, a mathematical expression: $0.01 \leq a \leq 0.2$ may be satisfied, or a mathematical expression: $0.05 \leq a \leq 0.2$ may be satisfied.

In order to enhance the lithium ion conductivity of the solid electrolyte material, in the composition formula (1), a mathematical expression: $0.9 \leq c \leq 1.2$ may be satisfied. In order to further enhance the ion conductivity of the solid electrolyte material, a mathematical expression: $1.0 \leq c \leq 1.2$ may be satisfied.

In order to enhance the lithium ion conductivity of the solid electrolyte material, M may be one element selected from the group consisting of Al, Ga, In, Sc, and Bi.

In order to enhance the lithium ion conductivity of the solid electrolyte material, M may be at least one element selected from the group consisting of Al, Ga, and In. In order to reduce the cost, M may be Al.

The solid electrolyte material according to the First Embodiment may be crystalline or amorphous.

The shape of the solid electrolyte material according to the First Embodiment is not particularly limited. Examples of the shape are needle-like, spherical, and oval spherical shapes. The solid electrolyte material according to the First Embodiment may be particles. The solid electrolyte material according to the First Embodiment may be formed so as to have a pellet or plate shape.

In order to further enhance the ion conductivity and to form a good dispersion state with another material, such as an active material, when the solid electrolyte material according to the First Embodiment has a particulate (e.g., spherical) shape, the solid electrolyte material according to the First Embodiment may have a median diameter of 0.1 μm or more and 100 μm or less and desirably may have a median diameter of 0.5 μm or more and 10 μm or less. The median diameter means the particle size at which the accumulated volume in the volume-based particle size distribution is equal to 50%. The volume-based particle size distribution can be measured by a laser diffraction scattering method or with an image analyzer.

In order to form a good dispersion state of the solid electrolyte material and the active material, the solid electrolyte material according to the First Embodiment may have a median diameter smaller than that of the active material.

The solid electrolyte material according to the First Embodiment is manufactured by, for example, the following method.

Raw material powders of halides are prepared so as to give the compounding ratio of a target composition. As an example, when $Li_{2.22}(Zr_{0.6}Y_{0.2}Al_{0.2})_{1.05}Cl_6$ is produced, a LiCl raw material powder, a $ZrCl_4$ raw material powder, a $YCl_3$ raw material powder, and an $AlCl_3$ raw material powder (that is, four raw material powders of halides) are prepared such that the molar ratio of $LiCl:ZrCl_4:YCl_3:AlCl_3$ is 2.22:0.63:0.21:0.21. Raw material powders may be mixed at a molar ratio adjusted in advance so as to offset the change in composition that may occur during the synthesis process.

The raw material powders are reacted with each other mechanochemically (i.e., by a method of mechanochemical treatment) in a mixer, such as a planetary ball mill, to give a reaction product. The reaction product may be heat-treated in vacuum or in an inert atmosphere. Alternatively, a mixture of raw material powders may be heat-treated in vacuum or in an inert atmosphere to obtain a reaction product. The heat treatment may be performed at 100° C. or more and 650° C. or less for 1 hour or more.

The solid electrolyte material according to the First Embodiment is obtained by these methods.

Second Embodiment

A Second Embodiment will now be described. Items described in the First Embodiment will be appropriately omitted.

The battery according to the Second Embodiment includes a positive electrode, an electrolyte layer, and a negative electrode. The electrolyte layer is disposed between the positive electrode and the negative electrode.

At least one selected from the group consisting of the positive electrode, the electrolyte layer, and the negative electrode contains the solid electrolyte material according to the First Embodiment.

The battery according to the Second Embodiment has excellent charge and discharge characteristics.

FIG. 1 shows a cross-sectional view of a battery 1000 according to the Second Embodiment.

The battery 1000 includes a positive electrode 201, an electrolyte layer 202, and a negative electrode 203. The electrolyte layer 202 is disposed between the positive electrode 201 and the negative electrode 203.

The positive electrode 201 contains a positive electrode active material particle 204 and a solid electrolyte particle 100.

The electrolyte layer 202 contains an electrolyte material (e.g., a solid electrolyte material).

The negative electrode 203 contains a negative electrode active material particle 205 and a solid electrolyte particle 100.

The solid electrolyte particle 100 is a particle containing the solid electrolyte material according to the First Embodiment as a main component. The particle including the solid electrolyte material according to the First Embodiment as a main component denotes a particle in which the most abundant component is the solid electrolyte material according to the First Embodiment. The solid electrolyte particle 100 may be a particle consisting of the solid electrolyte material according to the First Embodiment.

The positive electrode 201 contains a material that can occlude and release metal ions such as lithium ions. The positive electrode 201 contains, for example, a positive electrode active material (e.g., positive electrode active material particle 204).

Examples of the positive electrode active material are a lithium-containing transition metal oxide, a transition metal fluoride, a polyanion material, a fluorinated polyanion material, a transition metal sulfide, a transition metal oxyfluoride, a transition metal oxysulfide, and a transition metal oxynitride. Examples of the lithium-containing transition metal oxide are $Li(NiCoAl)O_2$ and $LiCoO_2$.

The positive electrode active material particle 204 may have a median diameter of 0.1 μm or more and 100 μm or less. When the positive electrode active material particle 204 has a median diameter of 0.1 μm or more, the positive electrode active material particle 204 and the solid electrolyte particle 100 can be well dispersed in the positive electrode 201. Consequently, the battery has high charge and discharge characteristics. When the positive electrode active material particle 204 has a median diameter of 100 μm or less, the lithium diffusion speed in the positive electrode active material particle 204 is improved. Consequently, the battery can operate at high output.

The positive electrode active material particle 204 may have a median diameter larger than that of the solid electrolyte particle 100. Consequently, the positive electrode active material particle 204 and the solid electrolyte particle 100 can be well dispersed.

From the viewpoint of the energy density and the output of the battery, in the positive electrode 201, the ratio of the volume of the positive electrode active material particle 204 to the sum of the volume of the positive electrode active material particle 204 and the volume of the solid electrolyte particle 100 may be 0.30 or more and 0.95 or less.

From the viewpoint of the energy density and the output of the battery, the positive electrode 201 may have a thickness of 10 μm or more and 500 μm or less.

The electrolyte layer 202 contains an electrolyte material. The electrolyte material is, for example, a solid electrolyte material. The electrolyte layer 202 may be a solid electrolyte layer. The solid electrolyte material included in the electrolyte layer 202 may be the solid electrolyte material according to the First Embodiment.

The electrolyte layer 202 may be made of only the solid electrolyte material according to the First Embodiment.

The electrolyte layer 202 may be made of only a solid electrolyte material that is different from the solid electrolyte material according to the First Embodiment. Examples of the solid electrolyte material that is different from the solid electrolyte material according to the First Embodiment are $Li_2MgX'_4$, $Li_2FeX'_4$, $Li(Al, Ga, In)X'_4$, $Li_3(Al, Ga, In)X'_6$, and LiI. Here, X is at least one element selected from the group consisting of F, Cl, Br, and I.

Hereinafter, the solid electrolyte material according to the First Embodiment is referred to as a first solid electrolyte material. The solid electrolyte material that is different from the solid electrolyte material according to the First Embodiment is referred to as a second solid electrolyte material.

The electrolyte layer 202 may contain the second solid electrolyte material in addition to the first solid electrolyte material. In such a case, the first solid electrolyte material and the second solid electrolyte material may be uniformly dispersed.

A layer made of the first solid electrolyte material and a layer made of the second solid electrolyte material may be stacked successively along the layered direction of the battery 1000.

The electrolyte layer 202 may have a thickness of 1 μm or more and 100 μm or less. When the electrolyte layer 202 has a thickness of 1 μm or more, the positive electrode 201 and the negative electrode 203 are unlikely to be short-circuited. When the electrolyte layer 202 has a thickness of 100 μm or less, the battery can operate at high output.

The negative electrode 203 contains a material that can occlude and release metal ions such as lithium ions. The negative electrode 203 contains, for example, a negative electrode active material (e.g., negative electrode active material particle 205).

Examples of the negative electrode active material are a metal material, a carbon material, an oxide, a nitride, a tin compound, and a silicon compound. The metal material may be a single metal or may be an alloy. Examples of the metal material are a lithium metal and a lithium alloy. Examples of the carbon material are natural graphite, coke, graphitizing carbon, carbon fiber, spherical carbon, artificial graphite, and amorphous carbon. From the viewpoint of capacity density, preferred examples of the negative electrode active material are silicon (i.e., Si), tin (i.e., Sn), a silicon compound, and a tin compound.

The negative electrode active material particle 205 may have a median diameter of 0.1 μm or more and 100 μm or less. When the negative electrode active material particle 205 has a median diameter of 0.1 μm or more, the negative electrode active material particle 205 and the solid electrolyte particle 100 can be well dispersed in the negative electrode 203. Consequently, the charge and discharge characteristics of the battery are improved. When the negative electrode active material particle 205 has a median diameter of 100 μm or less, the lithium diffusion speed in the negative electrode active material particle 205 is improved. Consequently, the battery can operate at high output.

The negative electrode active material particle 205 may have a median diameter larger than that of the solid electrolyte particle 100. Consequently, the negative electrode active material particle 205 and the solid electrolyte particle 100 can be well dispersed.

From the viewpoint of the energy density and the output of the battery, in the negative electrode 203, the ratio of the volume of the negative electrode active material particle 205 to the sum of the volume of the negative electrode active material particle 205 and the volume of the solid electrolyte particle 100 may be 0.30 or more and 0.95 or less.

From the viewpoint of the energy density and the output of the battery, the negative electrode 203 may have a thickness of 10 μm or more and 500 μm or less.

At least one selected from the group consisting of the positive electrode 201, the electrolyte layer 202, and the negative electrode 203 may contain the second solid electrolyte material for the purpose of enhancing the ion conductivity, the chemical stability, and the electrochemical stability.

The second solid electrolyte material may be a sulfide solid electrolyte.

Examples of the sulfide solid electrolyte are $Li_2S-P_2S_5$, $Li_2S-SiS_2$, $Li_2S-B_2S_3$, $Li_2S-GeS_2$, $Li_{3.25}Ge_{0.25}P_{0.75}S_4$, and $Li_{10}GeP_2S_{12}$.

The second solid electrolyte material may be an oxide solid electrolyte.

Examples of the oxide solid electrolyte are:
(i) an NASICON-type solid electrolyte, such as $LiTi_2(PO_4)_3$ or an element-substituted product thereof;
(ii) a perovskite-type solid electrolyte, such as (LaLi)$TiO_3$;
(iii) an LISICON-type solid electrolyte, such as $Li_{14}ZnGe_4O_{16}$, $Li_4SiO_4$, $LiGeO_4$, or an element-substituted product thereof;
(iv) a garnet-type solid electrolyte, such as $Li_7La_3Zr_2O_{12}$ or an element-substituted product thereof; and
(v) $Li_3PO_4$ or an N-substituted product thereof.

The second solid electrolyte material may be a halide solid electrolyte.

Examples of the halide solid electrolyte are compounds represented by $Li_pMe_qY_rZ_6$. Here, p+m'q+3r=6 and r>0 are satisfied. Me is at least one element selected from the group consisting of metal elements other than Li and Y and metalloid elements. Z is at least one element selected from the group consisting of F, Cl, Br, and I. The value of m' represents the valence of Me.

The "metalloid elements" represent B, Si, Ge, As, Sb, and Te.

The "metal elements" represent all elements (excluding hydrogen) found in Groups 1 to 12 of the periodic table and all elements (excluding B, Si, Ge, As, Sb, Te, C, N, P, O, S, and Se) found in Groups 13 to 16 of the periodic table.

Me may be at least one element selected from the group consisting of Mg, Ca, Sr, Ba, Zn, Sc, Al, Ga, Bi, Zr, Hf, Ti, Sn, Ta, and Nb.

Examples of the halide solid electrolyte are $Li_3YCl_6$ and $Li_3YBr_6$.

The second solid electrolyte material may be an organic polymer solid electrolyte.

Examples of the organic polymer solid electrolyte are polymer compounds and lithium salt compounds.

The polymer compound may have an ethylene oxide structure. Since a polymer compound having an ethylene oxide structure can contain a large amount of a lithium salt, it is possible to further enhance the ion conductivity.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)$. One lithium salt selected from these examples may be used alone. Alternatively, a mixture of two or more lithium salts selected from these examples may be used.

At least one selected from the group consisting of the positive electrode 201, the electrolyte layer 202, and the negative electrode 203 may contain a nonaqueous electrolyte solution, a gel electrolyte, or an ionic liquid for the purpose of facilitating the transfer of lithium ions and improving the output characteristics of the battery.

The nonaqueous electrolyte solution includes a nonaqueous solvent and a lithium salt dissolved in the nonaqueous solvent. Examples of the nonaqueous solvent are a cyclic carbonate ester solvent, a chain carbonate ester solvent, a cyclic ether solvent, a chain ether solvent, a cyclic ester solvent, a chain ester solvent, and a fluorine solvent. Examples of the cyclic carbonate ester solvent are ethylene carbonate, propylene carbonate, and butylene carbonate. Examples of the chain carbonate ester solvent are dimethyl carbonate, ethyl methyl carbonate, and diethyl carbonate. Examples of the cyclic ether solvent are tetrahydrofuran, 1,4-dioxane, and 1,3-dioxolane. Examples of the chain ether solvent are 1,2-dimethoxyethane and 1,2-diethoxyethane. An example of the cyclic ester solvent is γ-butyrolactone. An example of the chain ester solvent is methyl acetate. Examples of the fluorine solvent are fluoroethylene carbonate, methyl fluoropropionate, fluorobenzene, fluoroethyl methyl carbonate, and fluorodimethylene carbonate. One nonaqueous solvent selected from these examples may be used alone. Alternatively, a mixture of two or more nonaqueous solvents selected from these examples may be used.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these examples may be used alone. Alternatively, a mixture of two or more lithium salts selected from these examples may be used. The concentration of the lithium salt may be, for example, 0.5 mol/L or more and 2 mol/L or less.

As the gel electrolyte, a polymer material impregnated with a nonaqueous electrolyte solution can be used. Examples of the polymer material are polyethylene oxide, polyacrylonitrile, polyvinylidene fluoride, polymethyl methacrylate, and a polymer having an ethylene oxide bond.

Examples of the cation included in the ionic liquid are:
(i) aliphatic chain quaternary salts, such as tetraalkylammonium and tetraalkylphosphonium;
(ii) aliphatic cyclic ammonium, such as pyrrolidiniums, morpholiniums, imidazoliniums, tetrahydropyrimidiniums, piperaziniums, and pyperidiniums; and
(iii) nitrogen-containing heterocyclic aromatic cations, such as pyridiniums and imidazoliniums.

Examples of the anon included in the ionic liquid are $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$.

The ionic liquid may contain a lithium salt.

At least one selected from the group consisting of the positive electrode 201, the electrolyte layer 202, and the negative electrode 203 may contain a binder for the purpose of improving the adhesion between particles.

Examples of the binder are polyvinylidene fluoride, polytetrafluoroethylene, polyethylene, polypropylene, aramid resin, polyamide, polyimide, polyamideimide, polyacrylonitrile, polyacrylic acid, methyl polyacrylate, ethyl polyacrylate, hexyl polyacrylate, polymethacrylic acid, methyl polymethacrylate, ethyl polymethacrylate, hexyl polymethacrylate, polyvinyl acetate, polyvinyl pyrrolidone, polyether, polyether sulfone, hexafluoropolypropylene, styrene butadiene rubber, and carboxymethyl cellulose. A copolymer can also be used as the binder. Examples of such a copolymer are copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the materials above may be used as the binder.

At least one selected from the group consisting of the positive electrode 201 and the negative electrode 203 may contain a conductive auxiliary agent for the purpose of enhancing the electron conductivity.

Examples of the conductive auxiliary agent are:
(i) graphites, such as natural graphite and artificial graphite;
(ii) carbon blacks, such as acetylene black and ketjen black;
(iii) conductive fibers, such as carbon fiber and metal fiber;
(iv) carbon fluoride;
(v) metal powders, such as aluminum;
(vi) conductive whiskers, such as zinc oxide and potassium titanate;
(vii) conductive metal oxides, such as titanium oxide; and
(viii) conductive polymer compounds, such as polyaniline, polypyrrole, and polythiophene.

In order to reduce the cost, the above material (i) or (ii) may be used as the conductive auxiliary agent.

Examples of the shape of the battery according to the Second Embodiment are coin-like, cylindrical, square, sheet-like, button-like, flat, and stacked shapes.

EXAMPLES

The present disclosure will now be described in more detail with reference to Examples.

Example 1

Production of Solid Electrolyte Material

As raw material powders, LiCl, $ZrCl_4$, $YCl_3$, and $AlCl_3$ were prepared at a molar ratio of $LiCl:ZrCl_4:YCl_3:AlCl_3$ of 2.22:0.63:0.21:0.21 in an argon atmosphere having a dew point of −60° C. or less (hereinafter, referred to as "an argon atmosphere"). These raw material powders were pulverized and mixed in a mortar. Thus, a powder mixture was obtained. The powder mixture was subjected to milling treatment using a planetary ball mill at 600 rpm for 12 hours. Thus, a powder of the solid electrolyte material of Example 1 was obtained. The solid electrolyte material of Example 1 had a composition represented by $Li_{2.22}(Zr_{0.6}Y_{0.2}Al_{0.2})_{1.05}Cl_6$.

The content of Li per unit weight of the solid electrolyte material of Example 1 was measured by atomic absorption spectrometry. The contents of Zr, Y, and Al per unit weight of the solid electrolyte material of Example 1 were measured by high-frequency inductively coupled plasma emission spectrometry. Based on the contents of Li, Zr, Y, and Al obtained from these measurement results, the molar ratio of Li:Zr:Y:Al was calculated. As a result, the molar ratio of Li:Zr:Y:Al of the solid electrolyte material of Example 1 was 2.22:0.63:0.21:0.21.

Evaluation of Ion Conductivity

Figure 2:
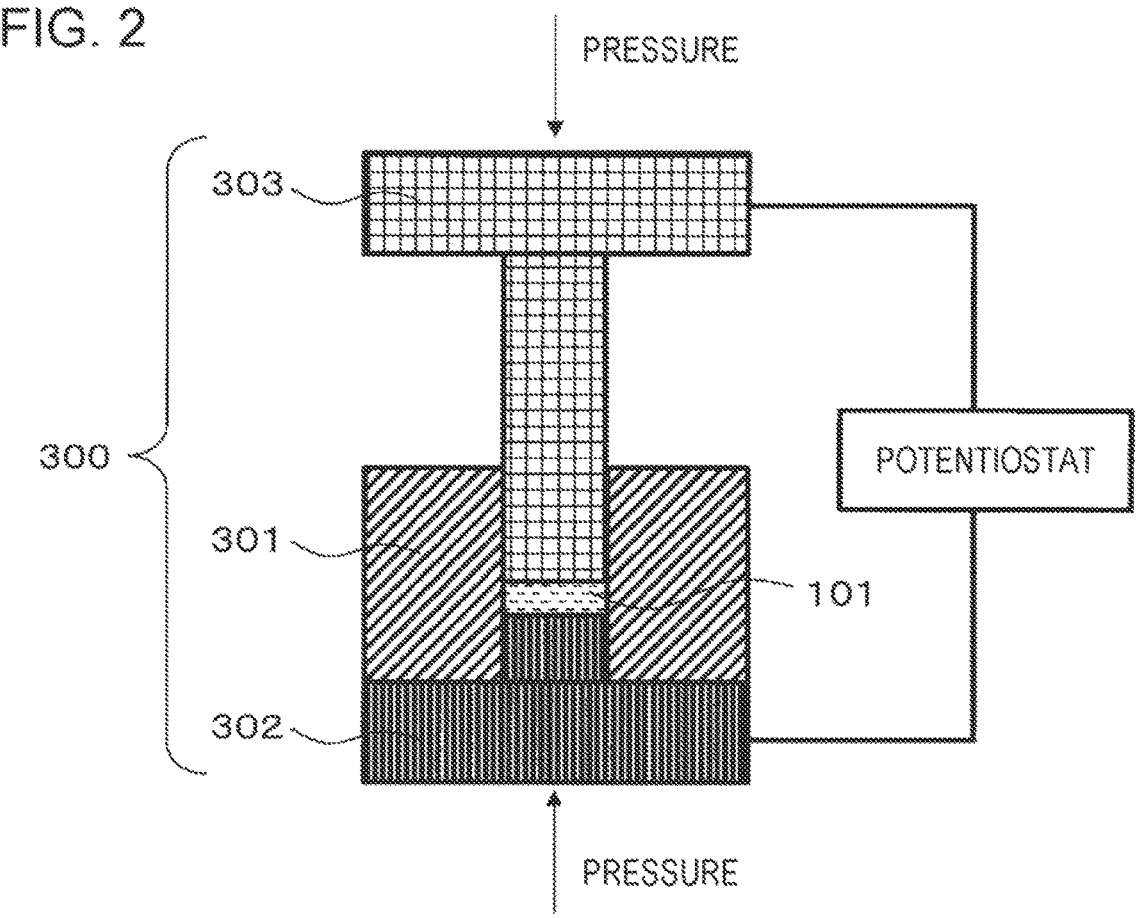
FIG. 2 shows a schematic view of a pressure molding die 300 to be used for evaluating the ion conductivity of a solid electrolyte material.

FIG. 2 shows a schematic view of a pressure molding die 300 to be used for evaluating the ion conductivity of a solid electrolyte material.

The pressure molding die 300 included a die 301, a lower punch 302, and an upper punch 303. The die 301 was formed from insulating polycarbonate. The lower punch 302 and the upper punch 303 were both made from electron conductive stainless steel.

The impedance of the solid electrolyte material of Example 1 was measured using the pressure molding die 300 shown in FIG. 2 by the following method.

The inside of the pressure molding die 300 was filled with the solid electrolyte material (corresponding to the powder 101 of the solid electrolyte material in FIG. 2) of Example 1 in a dry argon atmosphere. The solid electrolyte material of Example 1 was applied with a pressure of 300 MPa inside the pressure molding die 300 using the lower punch 302 and the upper punch 303.

The solid electrolyte material was connected to a potentiostat (VersaSTAT 4, Princeton Applied Research) equipped with a frequency response analyzer through the lower punch 302 and the upper punch 303 under the pressurized state. The impedance of the solid electrolyte material of Example 1 was measured by an electrochemical impedance measurement method at room temperature.

Figure 3:
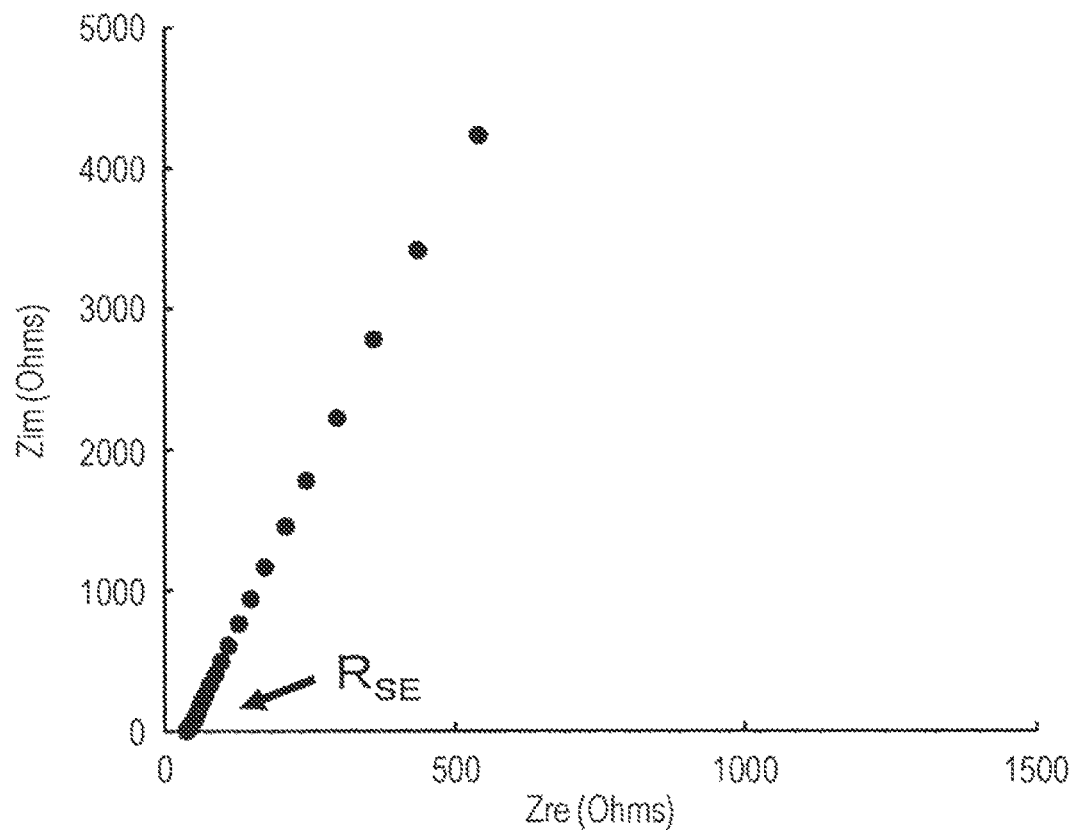
FIG. 3 is a Cole-Cole diagram showing the measurement result of the impedance of a solid electrolyte material of Example 1.

FIG. 3 is a Cole-Cole diagram showing the measurement results of the impedance of the solid electrolyte material in Example 1.

In FIG. 3, the real value of impedance at the measurement point at which the absolute value of the phase of complex impedance was the smallest was regarded as the resistance value of the solid electrolyte material of Example 1 to the ion conduction. Regarding the actual value, see the arrow $R_{SE}$ in FIG. 3. The ion conductivity was calculated using the resistance value based on a mathematical expression (2):

$$\sigma = (R_{SE} \times S/t)^{-1}, \text{ wherein}$$

$\sigma$ is the ion conductivity; S is the contact area of the solid electrolyte material with the upper punch 303 (which is equal to the area of the hollow portion of the die 301 in FIG. 2); $R_{SE}$ is the resistance value of the solid electrolyte material in the impedance measurement; and t is the thickness of the solid electrolyte material (which is equal to the thickness of the layer formed from the powder 101 of the solid electrolyte material in FIG. 2).

The ion conductivity of the solid electrolyte material of Example 1 measured at 22° C. was $2.09 \times 10^{-3}$ S/cm.

Production of Battery

The solid electrolyte material of Example 1 and LiCoO$_2$ were prepared at a volume ratio of 70:30 in a dry argon atmosphere. These materials were mixed in a mortar to provide a mixture.

The solid electrolyte material (100 mg) of Example 1, the mixture (11.80 mg) above, and an aluminum powder (14.7 mg) were stacked in this order in an insulation cylinder having an inner diameter of 9.5 mm to provide a layered product. A pressure of 300 MPa was applied to this layered product to form a solid electrolyte layer and a first electrode. The solid electrolyte layer had a thickness of 500 μm.

Subsequently, metal In (thickness: 200 μm) was stacked on the solid electrolyte layer to obtain a layered product. A pressure of 80 MPa was applied to this layered product to form a second electrode. The first electrode was a positive electrode, and the second electrode was a negative electrode.

Subsequently, stainless steel current collectors were attached to the first electrode and the second electrode, and current collecting leads were attached to the current collectors.

Finally, the inside of the insulation cylinder was shielded from the outside atmosphere and was sealed with an insulating ferrule.

Thus, a battery of Example 1 was obtained.

Charge-Discharge Test

Figure 4:
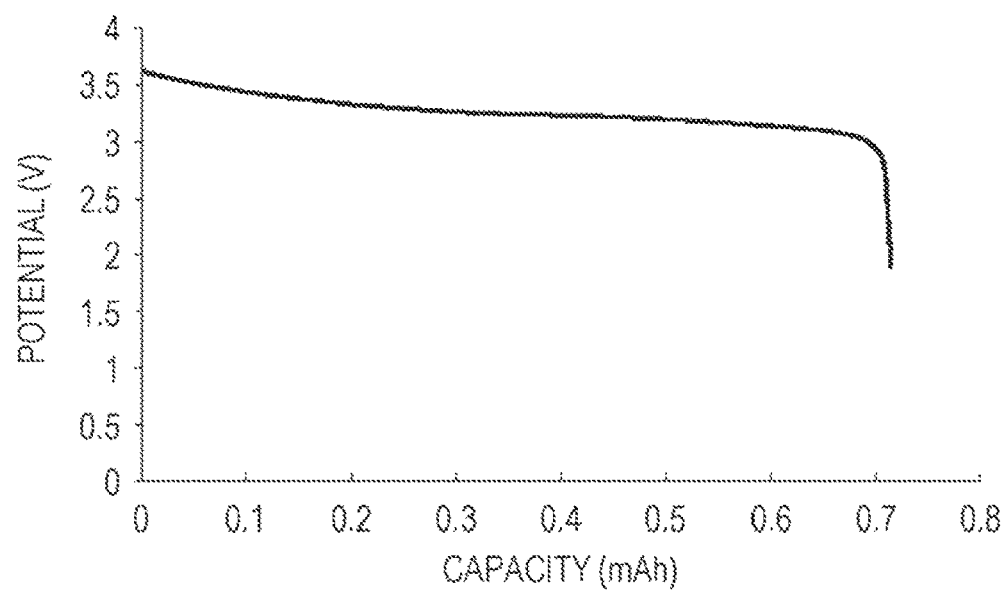
FIG. 4 is a graph showing the initial discharge characteristics of a battery of Example 1.

FIG. 4 is a graph showing the initial discharge characteristics of the battery of Example 1. The initial charge and discharge characteristics were measured by the following method.

The battery of Example 1 was placed in a thermostat of 25° C.

The battery of Example 1 was charged at a current density of 72 μA/cm$^2$ until the voltage reached 3.7 V. This current density corresponds to 0.05 C rate.

Subsequently, the battery of Example 1 was discharged at a current density of 72 μA/cm$^2$ until the voltage reached 1.9 V. This current density corresponds to 0.05 C rate.

As a result of the charge-discharge test, the battery of Example 1 had an initial discharge capacity of 0.71 mAh.

Examples 2 to 45

In Examples 2 to 44, as raw material powders, LiCl, ZrCl$_4$, YCl$_3$, and MCl$_3$ were prepared at a molar ratio of LiCl:ZrCl$_4$:YCl$_3$:MCl$_3$ of $\{6-(4-a-b)c\}:(1-a-b)c:bc:ac$.

In Example 45, as raw material powders, LiCl, LiBr, YCl$_3$, AlCl$_3$, and ZrBr$_4$ were prepared at a molar ratio of LiCl:LiBr:YCl$_3$:AlCl$_3$:ZrBr$_4$ of 1.74:0.48:0.21:0.21:0.63.

Solid electrolyte materials of Examples 2 to 45 were prepared as in Example 1 except for the above items.

The ion conductivities of the solid electrolyte materials of Examples 2 to 45 were measured as in Example 1. The measurement results are shown in Tables 1 and 2.

Batteries were prepared as in Example 1 using the solid electrolyte materials of Examples 2 to 45. The batteries of Examples 2 to 45 had good charge and discharge characteristics as in Example 1.

The elemental species represented by M and X and the values of a, b, and c in the solid electrolyte materials of Examples 2 to 45 are shown in Tables 1 and 2.

Comparative Example 1

In Comparative Example 1, as raw material powders, LiCl and YCl$_3$ were prepared at a molar ratio of LiCl:YCl$_3$ of 3:1. A solid electrolyte material of Comparative Example 1 was obtained as in Example 1 except for the above items.

The ion conductivity of the solid electrolyte material of Comparative Example 1 was measured as in Example 1. As a result, the ion conductivity of the solid electrolyte material of Comparative Example 1 at 22° C. was $5.70 \times 10^{-4}$ S/cm.

TABLE 1

| | M | a | b | c | X | Composition | Ion conductance (S/cm) |
|---|---|---|---|---|---|---|---|
| Example 1 | Al | 0.2 | 0.2 | 1.05 | Cl | Li$_{2.22}$(Zr$_{0.6}$Al$_{0.2}$Y$_{0.2}$)$_{1.05}$Cl$_6$ | $2.09 \times 10^{-3}$ |
| Example 2 | Al | 0.05 | 0.1 | 1 | Cl | Li$_{2.15}$Zr$_{0.85}$Y$_{0.1}$Al$_{0.05}$Cl$_6$ | $9.91 \times 10^{-4}$ |
| Example 3 | Al | 0.05 | 0.45 | 1 | Cl | Li$_{2.5}$Zr$_{0.5}$Y$_{0.45}$Al$_{0.05}$Cl$_6$ | $1.19 \times 10^{-3}$ |
| Example 4 | Al | 0.05 | 0.5 | 1 | Cl | Li$_{2.55}$Zr$_{0.45}$Y$_{0.5}$Al$_{0.05}$Cl$_6$ | $1.22 \times 10^{-3}$ |
| Example 5 | Al | 0.05 | 0.85 | 1 | Cl | Li$_{2.9}$Zr$_{0.1}$Y$_{0.85}$Al$_{0.05}$Cl$_6$ | $6.91 \times 10^{-4}$ |

TABLE 1-continued

| | M | a | b | c | X | Composition | Ion conductance (S/cm) |
|---|---|---|---|---|---|---|---|
| Example 6 | Al | 0.1 | 0.5 | 1 | Cl | $Li_{2.6}Zr_{0.4}Y_{0.5}Al_{0.1}Cl_6$ | $1.07 \times 10^{-3}$ |
| Example 7 | Al | 0.1 | 0.4 | 1 | Cl | $Li_{2.5}Zr_{0.5}Y_{0.4}Al_{0.1}Cl_6$ | $1.40 \times 10^{-3}$ |
| Example 8 | Al | 0.15 | 0.35 | 1 | Cl | $Li_{2.5}Zr_{0.5}Y_{0.35}Al_{0.15}Cl_6$ | $1.28 \times 10^{-3}$ |
| Example 9 | Al | 0.2 | 0.3 | 1 | Cl | $Li_{2.5}Zr_{0.5}Y_{0.3}Al_{0.2}Cl_6$ | $1.57 \times 10^{-3}$ |
| Example 10 | Al | 0.2 | 0.5 | 1 | Cl | $Li_{2.7}Zr_{0.3}Y_{0.5}Al_{0.2}Cl_6$ | $1.58 \times 10^{-3}$ |
| Example 11 | Al | 0.3 | 0.2 | 1 | Cl | $Li_{2.5}Zr_{0.5}Y_{0.2}Al_{0.3}Cl_6$ | $7.05 \times 10^{-4}$ |
| Example 12 | Al | 0.3 | 0.5 | 1 | Cl | $Li_{2.8}Zr_{0.2}Y_{0.5}Al_{0.3}Cl_6$ | $7.94 \times 10^{-4}$ |
| Example 13 | Al | 0.33 | 0.33 | 1 | Cl | $Li_{2.7}Zr_{0.33}Y_{0.33}Al_{0.33}Cl_6$ | $8.61 \times 10^{-4}$ |
| Example 14 | Al | 0.4 | 0.1 | 1 | Cl | $Li_{2.5}Zr_{0.5}Y_{0.1}Al_{0.4}Cl_6$ | $9.71 \times 10^{-4}$ |
| Example 15 | Al | 0.4 | 0.5 | 1 | Cl | $Li_{2.9}Zr_{0.1}Y_{0.5}Al_{0.4}Cl_6$ | $6.61 \times 10^{-4}$ |
| Example 16 | Al | 0.2 | 0.3 | 0.9 | Cl | $Li_{2.85}(Zr_{0.5}Y_{0.3}Al_{0.2})_{0.9}Cl_6$ | $7.35 \times 10^{-4}$ |
| Example 17 | Al | 0.2 | 0.3 | 1.01 | Cl | $Li_{2.465}(Zr_{0.5}Al_{0.2}Y_{0.3})_{1.01}Cl_6$ | $1.66 \times 10^{-3}$ |
| Example 18 | Al | 0.2 | 0.5 | 1.01 | Cl | $Li_{2.667}(Zr_{0.3}Al_{0.2}Y_{0.5})_{1.01}Cl_6$ | $1.58 \times 10^{-3}$ |
| Example 19 | Al | 0.2 | 0.3 | 1.03 | Cl | $Li_{2.395}(Zr_{0.5}Al_{0.2}Y_{0.3})_{1.03}Cl_6$ | $1.65 \times 10^{-3}$ |
| Example 20 | Al | 0.2 | 0.5 | 1.03 | Cl | $Li_{2.601}(Zr_{0.3}Al_{0.2}Y_{0.5})_{1.03}Cl_6$ | $1.63 \times 10^{-3}$ |
| Example 21 | Al | 0.2 | 0.3 | 1.05 | Cl | $Li_{2.325}(Zr_{0.5}Y_{0.3}Al_{0.2})_{1.05}Cl_6$ | $1.93 \times 10^{-3}$ |
| Example 22 | Al | 0.2 | 0.5 | 1.05 | Cl | $Li_{2.535}(Zr_{0.3}Al_{0.2}Y_{0.5})_{1.05}Cl_6$ | $1.76 \times 10^{-3}$ |
| Example 23 | Al | 0.2 | 0.3 | 1.07 | Cl | $Li_{2.255}(Zr_{0.5}Y_{0.3}Al_{0.2})_{1.07}Cl_6$ | $1.52 \times 10^{-3}$ |
| Example 24 | Al | 0.2 | 0.5 | 1.07 | Cl | $Li_{2.469}(Zr_{0.3}Al_{0.2}Y_{0.5})_{1.07}Cl_6$ | $1.54 \times 10^{-3}$ |
| Example 25 | Al | 0.2 | 0.3 | 1.1 | Cl | $Li_{2.15}(Zr_{0.5}Y_{0.3}Al_{0.2})_{1.1}Cl_6$ | $1.65 \times 10^{-3}$ |
| Example 26 | Al | 0.2 | 0.3 | 1.2 | Cl | $Li_{1.8}(Zr_{0.5}Y_{0.3}Al_{0.2})_{1.2}Cl_6$ | $1.25 \times 10^{-3}$ |

TABLE 2

| | M | a | b | c | X | Composition | Ion conductance (S/cm) |
|---|---|---|---|---|---|---|---|
| Example 27 | Ga | 0.05 | 0.45 | 1 | Cl | $Li_{2.5}Zr_{0.5}Y_{0.45}Ga_{0.05}Cl_6$ | $1.17 \times 10^{-3}$ |
| Example 28 | Ga | 0.05 | 0.5 | 1 | Cl | $Li_{2.55}Zr_{0.45}Y_{0.5}Ga_{0.05}Cl_6$ | $1.25 \times 10^{-3}$ |
| Example 29 | Ga | 0.1 | 0.4 | 1 | Cl | $Li_{2.5}Zr_{0.5}Y_{0.4}Ga_{0.1}Cl_6$ | $1.25 \times 10^{-3}$ |
| Example 30 | Ga | 0.1 | 0.5 | 1 | Cl | $Li_{2.6}Zr_{0.4}Y_{0.5}Ga_{0.1}Cl_6$ | $1.08 \times 10^{-3}$ |
| Example 31 | Ga | 0.2 | 0.3 | 1 | Cl | $Li_{2.5}Zr_{0.5}Y_{0.3}Ga_{0.2}Cl_6$ | $1.26 \times 10^{-3}$ |
| Example 32 | Ga | 0.2 | 0.5 | 1 | Cl | $Li_{2.7}Zr_{0.3}Y_{0.5}Ga_{0.2}Cl_6$ | $1.35 \times 10^{-3}$ |
| Example 33 | Ga | 0.4 | 0.1 | 1 | Cl | $Li_{2.5}Zr_{0.5}Y_{0.1}Ga_{0.4}Cl_6$ | $1.02 \times 10^{-3}$ |
| Example 34 | In | 0.05 | 0.45 | 1 | Cl | $Li_{2.5}Zr_{0.5}Y_{0.45}In_{0.05}Cl_6$ | $1.51 \times 10^{-3}$ |
| Example 35 | In | 0.05 | 0.5 | 1 | Cl | $Li_{2.55}Zr_{0.45}Y_{0.5}In_{0.05}Cl_6$ | $1.68 \times 10^{-3}$ |
| Example 36 | In | 0.1 | 0.4 | 1 | Cl | $Li_{2.5}Zr_{0.5}Y_{0.4}In_{0.1}Cl_6$ | $1.53 \times 10^{-3}$ |
| Example 37 | In | 0.1 | 0.5 | 1 | Cl | $Li_{2.6}Zr_{0.4}Y_{0.5}In_{0.1}Cl_6$ | $1.36 \times 10^{-3}$ |
| Example 38 | In | 0.2 | 0.3 | 1 | Cl | $Li_{2.5}Zr_{0.5}Y_{0.3}In_{0.2}Cl_6$ | $1.23 \times 10^{-3}$ |
| Example 39 | In | 0.2 | 0.5 | 1 | Cl | $Li_{2.7}Zr_{0.3}Y_{0.5}In_{0.2}Cl_6$ | $1.13 \times 10^{-3}$ |
| Example 40 | In | 0.4 | 0.1 | 1 | Cl | $Li_{2.5}Zr_{0.5}Y_{0.1}In_{0.4}Cl_6$ | $1.08 \times 10^{-3}$ |
| Example 41 | Sc | 0.05 | 0.5 | 1 | Cl | $Li_{2.55}Zr_{0.45}Y_{0.5}Sc_{0.05}Cl_6$ | $1.46 \times 10^{-3}$ |
| Example 42 | Sc | 0.2 | 0.5 | 1 | Cl | $Li_{2.7}Zr_{0.3}Y_{0.5}Sc_{0.2}Cl_6$ | $8.95 \times 10^{-4}$ |
| Example 43 | Bi | 0.05 | 0.5 | 1 | Cl | $Li_{2.55}Zr_{0.45}Y_{0.5}Bi_{0.05}Cl_6$ | $1.32 \times 10^{-3}$ |
| Example 44 | Bi | 0.1 | 0.5 | 1 | Cl | $Li_{2.6}Zr_{0.4}Y_{0.5}Bi_{0.1}Cl_6$ | $1.42 \times 10^{-3}$ |
| Example 45 | Al | 0.2 | 0.2 | 1.05 | Cl, Br | $Li_{2.22}(Zr_{0.6}Y_{0.2}Al_{0.2})_{1.05}Cl_3Br_3$ | $1.72 \times 10^{-3}$ |
| Comparative Example 1 | — | 0 | 1 | 1 | Cl | $Li_3YCl_6$ | $5.70 \times 10^{-4}$ |

Consideration

As obvious from Table 1, the solid electrolyte materials of Examples 1 to 45 have a high ion conductivity of $6 \times 10^{-4}$ S/Cm or more at room temperature.

As obvious from Table 1, when the value of "a" is 0.05 or more and 0.4 or less, the solid electrolyte material has a high ion conductivity. As obvious from comparison of Examples 6 and 10 with Examples 12 and 15, when the value of "a" is 0.05 or more and 0.2 or less, the ion conductivity is further high. It is inferred that even if the value "a" is less than 0.05, the solid electrolyte material has a high ion conductivity. The value of "a" may be, for example, 0.01 or more and 0.4 or less.

As obvious from Table 1, when the value of "c" is 0.9 or more and 1.2 or less, the solid electrolyte material has a high ion conductivity. As obvious from comparison of Examples 9, 17, 19, 21, 23, 25, and 26 with Example 16, when the value of "c" is 1.0 or more and 1.2 or less, the ion conductivity is further high.

In all Examples 1 to 45, the batteries were charged and discharged at room temperature.

Since the solid electrolyte materials of Examples 1 to 45 do not contain sulfur, hydrogen sulfide is not generated.

As described above, the solid electrolyte material according to the present disclosure has a high lithium ion conductivity and is suitable for providing a battery that can be satisfactorily charged and discharged.

The solid electrolyte material of the present disclosure is used in, for example, a battery (for example, all-solid lithium ion secondary battery).

What is claimed is:
1. A solid electrolyte material consisting essentially of Li, Zr, Y, M, and X, wherein:
M is at least one element selected from the group consisting of Al, Ga, In, Sc, and Bi;
X is at least one element selected from the group consisting of Cl and Br; and
the solid electrolyte material is represented by:

$$Li_{6-(4-a-b)c}(Zr_{1-a-b}Y_bM_a)_cX_6$$

where:

$a > 0$;

$b > 0$;

$(a+b) < 1$; and $0 < c < 1.5$.

2. The solid electrolyte material according to claim 1, wherein:

$0.01 \leq a \leq 0.4$.

3. The solid electrolyte material according to claim 2, wherein:

$0.01 \leq a \leq 0.2$.

4. The solid electrolyte material according to claim 1, wherein:

$0.9 \leq c \leq 1.2$.

5. The solid electrolyte material according to claim 4, wherein:

$1.0 \leq c \leq 1.2$.

6. The solid electrolyte material according to claim 1, wherein M is at least one element selected from the group consisting of Al, Ga, and In.

7. A battery comprising:
a positive electrode;
a negative electrode; and
an electrolyte layer disposed between the positive electrode and the negative electrode,
wherein at least one selected from the group consisting of the positive electrode, the negative electrode, and the electrolyte layer contains the solid electrolyte material according to claim 1.

* * * * *